BODY SIGNAL PICKUP ELECTRODE

Filed March 5, 1965

INVENTOR.
PHILLIP H. DARLING
BY Ralph G. Hohenfeldt
ATTORNEY

United States Patent Office
3,340,868
Patented Sept. 12, 1967

3,340,868

BODY SIGNAL PICKUP ELECTRODE

Phillip H. Darling, Bayside, Wis., assignor to General Electric Company, a corporation of New York Filed Mar. 5, 1965, Ser. No. 437,477
2 Claims. (Cl. 128—2.06)

ABSTRACT OF THE DISCLOSURE

An adhesive strip with a hole has a metal disk adhered on one side. A pliable insulating disk with several holes lying within the boundary of the metal disk is held against it by means of adhesion of its imperforate margins to the strip. An electrical lead is connected to the metal disk through the hole in the strip. In use, the several holes of the pliable insulating disk are occupied by electrolyte paste. A breakable capsule of paste may be carried by the adhesive strip.

This invention relates to improvements in a self-adhering electrode for transferring electric signals to and from the body. The electrode is intended for use as an input or output terminal with electromedical diagnostic and therapeutic apparatus such as electrocardiographs, pacemakers, stimulators, impedance measuring devices and others.

It is among the objects of the invention to provide an electrode that is comfortable on the body, that has a low profile and affords minimum conspicuousness and interference with the wearer's garments, that is easy to use, and that is inexpensive.

Other important objects of the invention are to provide an electrode that has low and stable conact impedance over its period of use so that spurious electric signals are not introduced into the measuring instrument.

Another object is to provide a body electrode with its own encapsulated supply of electrolyte for augmenting conductivity when the electrode is ready for use.

Achievement of the foregoing and specific objects will appear from time to time throughout the ensuing description of a preferred embodiment of the invention in conjunction with the drawing in which.

Figure 1:
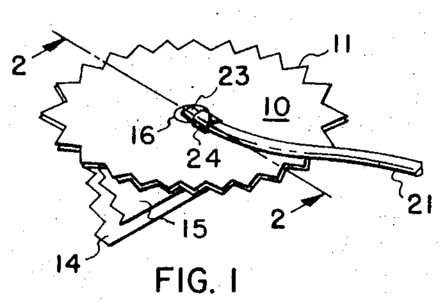
FIGURE 1 is a top plan view of the new electrode assembly.
Figure 3:
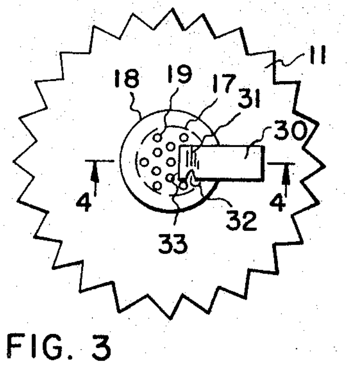
Figure 4:
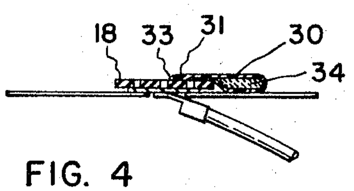

FIGURE 3 corresponds with a bottom view of the electrode assembly in FIGURE 1 and is an alternative embodiment in the sense that an electrolyte capsule has been added;

FIGURE 4 is a sectional view taken on the line 4—4 in FIG. 3; and

Figure 5:
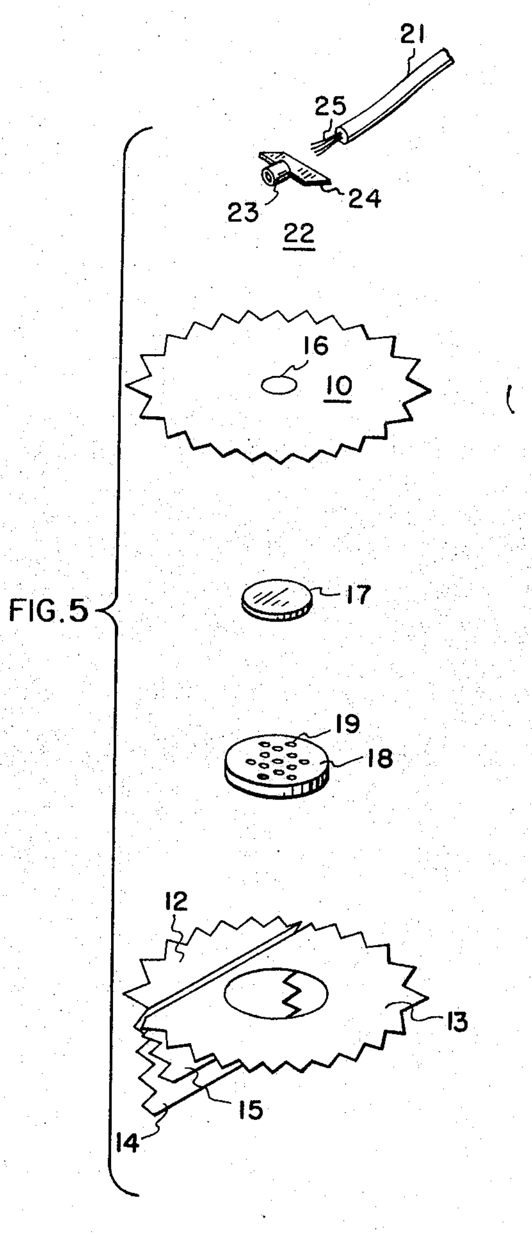

FIGURE 5 is an exploded view of the new electrode assembly.

Figure 2:
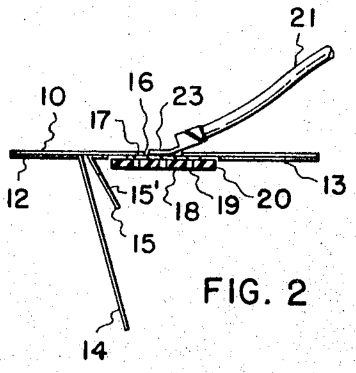
FIGURE 2 is a sectional view taken on the line 2—2 in FIG. 1.

An embodiment of the new electrode ready for use is shown in FIGURES 1 and 2. It comprises an essentially circular piece of surgical tape 10 that has a pinked or notched edge 11. The visible or top side of tape 10 is non-adhesive, but its bottom side has a permanent pressure-sensitive adhesive coating thereon. Tape 10 is prevented from sticking on its bottom side by a releasable backing strip that is temporarily adhered to the adhesive interface with the tape and that is divided into two portions 12 and 13 which terminate in tabs 14 and 15, respectively. These tabs 14 and 15 facilitate peeling off of the backing strips 12 and 13 immediately prior to pressing the electrode assembly onto the body surface. Tabs 14 and 15 ordinarily lie flat against and in parallel with the surgical tape part 10 when the electrode is in its original package. The longer tab covers the bottom of the electrode assembly in this condition. Tab 15 may have a semi-circular notch 15' in its edge with a slightly larger radius than a spacer 17 so that the tab will lie flat when folded against the tape.

In FIGURES 1, 2, and 5 it is seen that tape 10 has a central hole 16 and that a thin metal disk 17 is adhered to the bottom side of the tape in a position to cover the hole and extend beyond its diameter somewhat. Placed immediately under metal disk 17, is a pliable insulating spacer 18 that may be naturally porous but preferably has a plurality of small holes 19. Because spacer 18 is larger than disk 17, the peripheral edge of the spacer is pressed against and adheres to the adhesive side of surgical tape 10 throughout the annular region 20 as may be seen best in FIGURE 2. Where the reference numeral 20 is applied in this view a small gap is shown, but it will be understood that the edge of spacer 18 is actually in contact with the adhesive bottom side of tape 10 which it may readily do because it is pliable and the metal disk 17 is so thin.

Because of central hole 16 in surgical tape 10, the top of metal disk 17 is exposed to enable making an external electrical connection with the electrode and thereby provide for running an insulated lead wire 21 from the electrode to an electrical instrument. At the top of FIGURE 5, one may see how the lead wire 21 is preassembled with a terminal 22 before attachment to the electrode. Terminal 22 has a tubular part 23 formed integrally with a pair of beveled laterally extending wings 24. The interior of tubular part 23 may be tinned, but if not, it should be clean. The bared and tinned strands 25 of lead 21 are then admitted into the tubular part and the latter is crimped to seize the wire strands. At the same time, wings 24 are caused to wrap around with the beveled ends overlapping and grip the insulation on wire 21 so as to relieve the stress on the wire strands.

The flattened tubular part 23 of wire terminal 22 is spot welded to the metal disk 17 as can be seen best in FIGURE 2. Of course, spot welding is done during the assembly process prior to positioning the pliable insulating spacer 18. Incidental to spot welding, the tinned wire ends are caused to be soldered to the interior of the tubular part 23. Resulting from these attachment procedures is a connection that is free of electrical noise or impedance variations when varying stresses are placed on the electrode by movement of the patient or the lead wires.

Use of the perforated insulating spacer 18 is an important feature of the present invention. This spacer may be made of natural or artificial gum rubber or other pliable insulating material such as vinyl and in an actual embodiment has been made three-fourths of an inch in diameter and $\frac{1}{32}$ of an inch thick. As indicated earlier, the spacer must be a little larger than the metal disk 17 which may be 0.005 inch thick and ½ inch in diameter. Holes 19 in the spacer may be about 0.005 inch in diameter. The holes should lie within the border of the metal disk when the disk 17 and spacer are superimposed.

Before the electrode is put into service, an electrically conductive paste is applied to the bottom side of spacer 18 as it appears in FIGURE 2. This is usually done after the backing strips 12 and 13 are peeled off. The paste may be spread with the finger to thereby fill the holes 19 and establish a plurality of conductive paths through the spacer 18 to the metal disk 17. In reality, there are as many parallel conductive paths constituted by as many cylindrical columns of paste as there are holes in the spacer 18. Reasonable amounts of flexing of the electrodes will not adversely affect the electrical continuity of the columns where they junction with the surface of metal disk 17 because these portions of electrolyte are trapped. A similar effect is obtained where the columns contact the patient's skin. Moreover, the length of the columns always remain the same so as to conform to any contour variations in the skin that might result from body movement. It is believed that the constancy of these conductive paths contribute significantly to the stable and low contact impedance of the electrode and the surprising absence of electrical noise or signal artefacts over extended periods of use.

FIGURE 3 shows what is essentially a bottom view of the electrode in FIGURE 2 with backing strips 13 and 14 removed and with a new feature added. The new feature resides in adhering a sealed capsule 30 of electrolyte jell onto the adhesive side of tape 11. Capsule 30 is preferably made of a thin plastic film. The capsule is sealed all around and particularly is sealed on a line 31 where it is also notched at 32 to facilitate tearing off the end 33 beyond the notch. When end 33 is torn off, the capsule is open and may be squeezed to cause the conductive electrolyte jell 34, as seen in FIGURE 4, to exude onto spacer 18. The electrolyte may be squeezed out by applying the electrode to the skin and pressing from the outside. This traps the empty capsule 30 under the adhesive tape 10. The user may, of course, peel off the electrolyte capsule and then spread the electrolyte on the spacer before applying the electrode to the skin, if desired.

Capsule 30 has been made of a tube of polyethylene film about 0.002 inch thick and heat-sealed at its ends. It may also be made of other plastics or metal foil. The tearing notch 32 is not imperative. Experience has shown that about 0.4 cubic centimeter of electrolyte is an appropriate amount for an electrode assembly of the size herein described. Electrolyte 34 is preferably viscous and may be one of the commercially available sodium chloride containing mixtures known as electrode paste. When the new electrode does not have the capsule attached, the paste may be dispensed from a tube in the conventional way. This, however, sacrifices the advantage of having an individualized and proper quantity of electrode paste conveniently available.

Another alternative, not shown, is to shape the electrolyte capsule like a toroid or doughnut and adhere it on tape 10 so as to encircle the spacer 18. The capsule may also be coated with pressure sensitive adhesive on its outside surface, but this is not absolutely necessary. With this construction, the tape 10 may be applied to the body and the electrode pressed to break the capsule and cause the paste to exude onto the spacer 18 to fill its holes 19. Because the circular capsule may have small cross-section, it does not occupy very much of the adhesive area of tape 10 and hence, it does not diminish the holding power of the electrode. The toroidally shaped capsule may also be adhered directly to the spacer 18 and made with an inside opening that encompasses the holes 19 and an outside diameter that is about the same as that of the spacer.

Before applying the above described electrode to the body, it is desirable to prepare the skin by removing dead skin cells and natural body oils. This involves rubbing the skin surface with a fine abrasive pad after which the surface should be rubbed three or four times with different alcohol-soaked pads and air dried. The electrode may then be pressed on.

Although the new electrode has been described in considerable detail, it is to be understood that such description is intended to be illustrative rather than limiting, for the invention may be variously embodied and is to be limited in scope only by interpreting the claims which follow.

It is claimed:

1. An electrode for self-adhering attachment to a body comprising:

(a) a flexible tape means having a pressure sensitive adhesive on one surface thereof and having a hole through it,
(b) a thin metal disk adhered to the adhesive surface to cover the hole,
(c) an electric terminal fastened to the disk through the hole,
(d) a pliable insulating member having a plurality of holes lying within the boundary of the disk,
(e) the insulating member being in face-to-face contact with the metal disk and being of larger size than the disk to extend beyond it and adhere at its boundary to the adhesive surface,
(f) the said holes being adapted to receive electrolyte exclusively and thereby create a plurality of parallel conductive paths solely by way of the electrolyte between metal disk and the body surface when the electrode is adhesively attached to the body.

2. The invention set forth in claim 1 including:

(a) a capsule of electrolyte adhered to the electrode,
(b) the said capsule being adapted to open in the region of the insulating member and to exude electrolyte thereon and to fill the holes when the capsule is pressed.

References Cited

UNITED STATES PATENTS

| | | | |
|---|---|---|---|
| 3,085,577 | 4/1963 | Berman et al. | 128—418 |
| 3,151,619 | 10/1964 | Sullivan | 128—417 |
| 3,170,459 | 2/1965 | Phipps et al. | 128—2.06 |
| 3,207,161 | 9/1965 | Dietz | 128—404 |
| 3,295,515 | 1/1967 | Kahn | 128—2.06 |

RICHARD A. GAUDET, *Primary Examiner.*

W. E. KAMM, *Assistant Examiner.*